United States Patent [19]

Ingram et al.

[11] Patent Number: 5,554,327
[45] Date of Patent: Sep. 10, 1996

[54] METHOD AND APPARATUS FOR COMPRESSION MOLDING PLASTIC ARTICLES

[75] Inventors: Keith W. Ingram, Holland, Ohio; David C. Thompson, Ft. Wayne, Ind.

[73] Assignee: Owens-Illinois Closure Inc., Toledo, Ohio

[21] Appl. No.: 135,829

[22] Filed: Oct. 14, 1993

[51] Int. Cl.$^6$ .......................... B29C 43/08; B29C 43/18; B29C 43/58
[52] U.S. Cl. ................ 264/40.5; 264/268; 264/297.6; 264/310; 425/127; 425/149; 425/150; 425/189; 425/195; 425/348 R; 425/453; 425/457; 425/809
[58] Field of Search ............................ 264/267, 268, 264/297.5, 297.6, 310, 319, 320, 40.5; 425/127, 809, 411, 412, 418, 149, 189, 195, 150, 453, 457, 348 R

[56] References Cited

U.S. PATENT DOCUMENTS

| | | | |
|---|---|---|---|
| 2,072,536 | 3/1937 | Trickey et al. . | |
| 2,155,316 | 4/1939 | Lauterbach . | |
| 2,198,543 | 4/1940 | Lauterbach . | |
| 2,218,456 | 10/1940 | Soubier et al. . | |
| 2,227,265 | 12/1940 | Lauterbach . | |
| 2,235,222 | 3/1941 | Lauterbach . | |
| 2,402,462 | 6/1946 | Sullivan . | |
| 2,513,216 | 6/1950 | Sullivan et al. . | |
| 2,514,486 | 7/1950 | Green | 425/418 |
| 2,891,281 | 6/1959 | Heinzelman . | |
| 3,210,805 | 10/1965 | Hanai . | |
| 3,547,746 | 12/1970 | Gwinner | 264/268 |
| 3,657,941 | 4/1972 | Engler | 264/310 |
| 4,296,061 | 10/1981 | Buckingham . | |
| 4,314,799 | 2/1982 | Amberg et al. . | |
| 4,343,754 | 8/1982 | Wilde et al. . | |
| 4,355,759 | 10/1982 | Amberg . | |
| 4,398,875 | 8/1983 | Kawashima et al. | 264/268 |
| 4,497,765 | 2/1985 | Wilde et al. . | |
| 4,640,673 | 2/1987 | Takeda et al. . | |
| 4,690,666 | 9/1987 | Alexander et al. | 425/412 |
| 4,755,125 | 7/1988 | Takeda et al. . | |
| 4,776,782 | 10/1988 | Murayama et al. | 425/809 |
| 4,828,474 | 5/1989 | Ballantyne | 425/411 |
| 5,035,594 | 7/1991 | Murayama et al. . | |

FOREIGN PATENT DOCUMENTS 0091653  10/1983  European Pat. Off. .

Primary Examiner—Mathieu D. Vargot

[57] ABSTRACT

A method and apparatus for compression molding plastic articles including closures which includes providing coacting sets of tools including a first set for moving a core and core sleeve into engagement with a cavity mold on a second set of tooling. An actuator is provided between the first set of tooling and a fixed upper cam. The second set of tooling includes an associated actuator supporting the cavity mold and associated with a lower fixed cam. A nitrogen cylinder in the second set of tooling provides for control of the compression molding force. In a preferred form, a plurality of sets of tooling are provided in circumferentially spaced relation on a rotating turret supported by a central column. A common manifold supplies the pressure at accurately controlled pressure to each of the nitrogen cylinders. A control system is provided for monitoring and changing the pressure.

55 Claims, 14 Drawing Sheets

METHOD AND APPARATUS FOR COMPRESSION MOLDING PLASTIC ARTICLES

This invention relates to a method and apparatus for compression molding plastic articles including closures.

BACKGROUND AND SUMMARY OF THE INVENTION

It is common to compression mold plastic articles including closures, as contrasted to injection molding plastic articles. Typical patents comprise U.S. Pat. Nos. 2,072,536, 2,155,316, 2,218,456, 2,402,462, 2,891,281, 3,210,805, 4,296,061, 4,314,799, 4,343,754, 4,355,759, 4,497,765, 4,640,673, 4,755,125 and EPO 0 091 653 A2.

In the compression molding of plastic articles, there are inherent variations that can affect the resultant articles. One such variance is the manufacturing tolerance applied to the tools. Accordingly, the molding sets on a machine are not identical. Thus, when the tools are made up in the molding position, the volume of the space between the molding surfaces varies between mold sets. A further variance is the weight and/or volume of the plastic charge that is placed within each mold set.

Among the objectives of the present invention are to provide a method and apparatus for compression molding plastic articles including closures wherein the forming pressure can be accurately controlled; wherein the forming pressure can be readily adjusted; wherein lateral forces on the tooling are not applied directly to the forming tool; wherein the tooling may be readily replaced; wherein the number and size of tool stations can be readily changed; and wherein various kinds and sizes of articles including closures can be readily made by changing the tooling and associated actuating mechanisms; wherein the tooling will compensate for variations in pellet or charge weight, variations in mold tooling volume in the closed mold position and wherein a substantial overload such as a double charge of plastic can be readily absorbed without overloading the tooling or the overall apparatus.

In accordance with the invention, a method and apparatus for compression molding plastic articles including closures includes providing coacting sets of tools including a first set for moving a core and core sleeve into engagement with a cavity mold relative to a second set of tooling. The first set of tooling includes an actuator between the tooling and a fixed upper cam. The second set of tooling includes an actuator supporting the cavity mold and associated with a lower fixed cam. A gas cylinder charged with atmospheric gas at a predetermined pressure, preferably nitrogen, is provided in the second set of tooling and controls the compression molding force. In a preferred form, a plurality of sets of tooling are provided in circumferentially spaced relation on a rotating turret supported by a central column. A common manifold supplies the pressure at accurately controlled pressure to each of the nitrogen cylinders.

In accordance with the invention, each individual gas charged cylinder in association with its individual tooling has a common predetermined pressure as defined by the system pressure, each cylinder being connected in parallel with each of all the tooling cylinders by means of connecting pipework and manifolds.

In the preferred form, each of the gas cylinders has a common diameter and consequently will require an equal force to deflect each of the pistons within its respective cylinder against the common system pressure. In the compression molding process, it is preferred that each molded part be molded with a constant molding force and that variations are held to a minimum. This force will be sufficient to fully form the part but not so high as to cause flashing of the material from the adjoining mold surfaces.

It is well known in the art that volumetric variations occur within the tooling due to manufacturing tolerances and that the plastic material charge can vary in weight and volume. Further, it is understood that occasional gross errors will occur in the pellet charge volume as a result of incorrect machine setting, or as a result of double charge of plastic, or as a result of a prior molded part not being released from the mold prior to receiving a further charge of material.

For this reason, it is preferred to include a means to compensate for the accumulated volumetric variance resulting from the above phenomena while not exceeding the preset molding force established by the system pressure previously mentioned.

Further, there is a limit of volumetric variance beyond which the resulting part is nonfunctional as defined by the desired geometry of the part being molded.

In a preferred form, each of the first set of tools is advanced a common fixed stroke toward the respective cavity within the second set of tools to close the mold and to form the plastic to fill the mold. Normally the plastic charge is within the desired weight tolerance to correctly form the part and the pressure in the melt builds up during the forming stage until the desired molding force is reached and the cavity is deflected against the supporting gas cylinder to limit any further increase in molding force. By this means, when the desired molding force is reached, the volumetric space within the tooling combination will remain constant for the duration of the stroke of the first set of tooling.

If the plastic charge was of a size less than the lower tolerance to produce a functional part and of insufficient size to fill the mold, then the desired molding force would not be achieved prior to the completion of the stroke of the first tooling and the resulting part could have voids, often referred to as "shorts".

Clearly, if a charge of material exceeded the maximum tolerance to produce a quality part, then it is important to ensure that the tooling volume is compensated by further deflection of the cavity under the control of its respective gas cylinder in order that the mold force does not reach such proportion as to damage the tooling or the machine.

To maintain a constant molding force within each of successive tools, it is preferred that the force compensating means is contained within the tool and thus independent of any external influences and has a minimum of moving parts to reduce friction. It is also preferred not to use mechanical springs for force compensation as they have a variance in spring rating, are subject to failure, and cannot readily be re-set.

3

Figure 5:
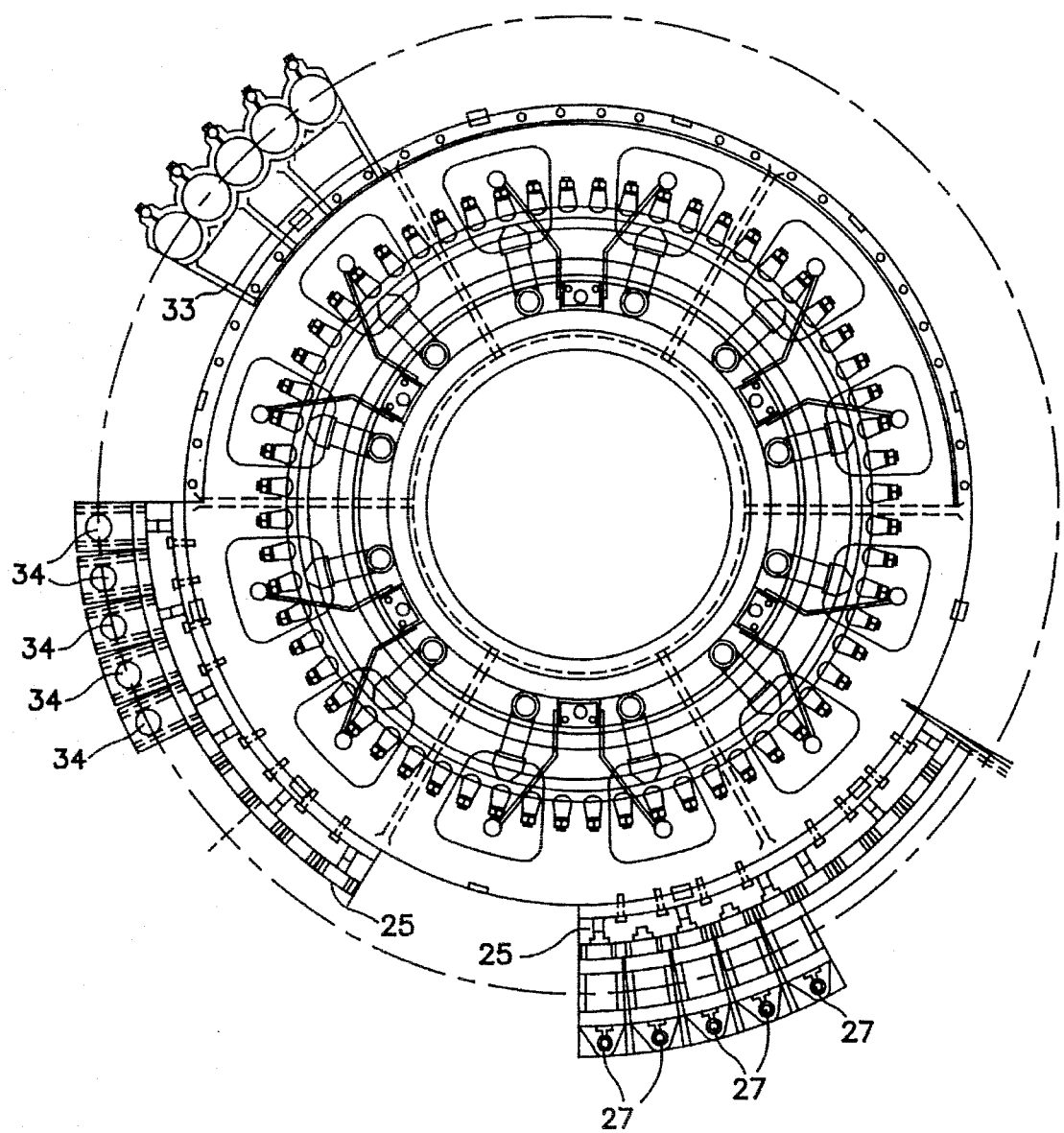

FIG. 5 is a partly diagrammatic horizontal sectional view.

Figure 6:
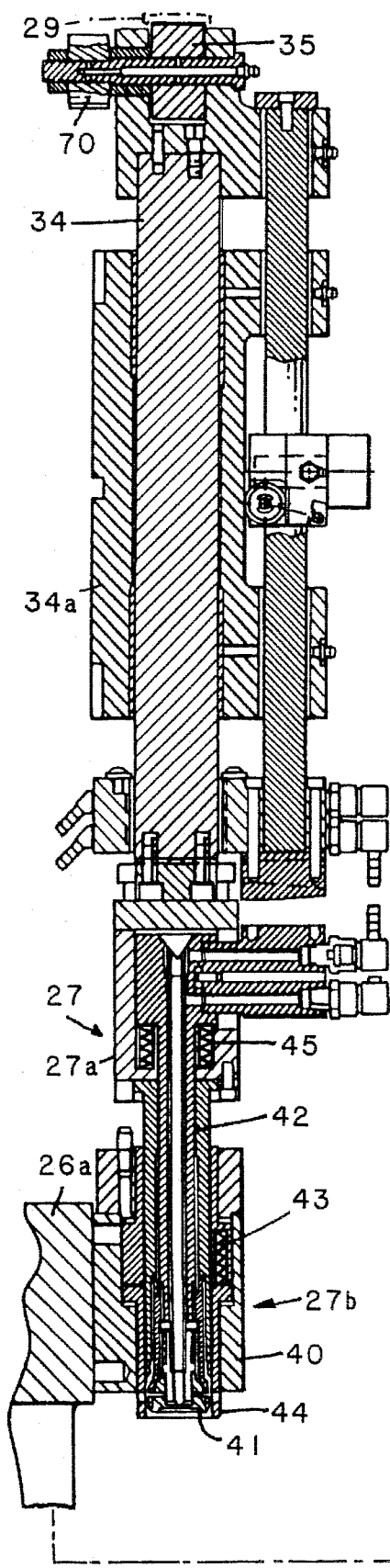
Figure 6:
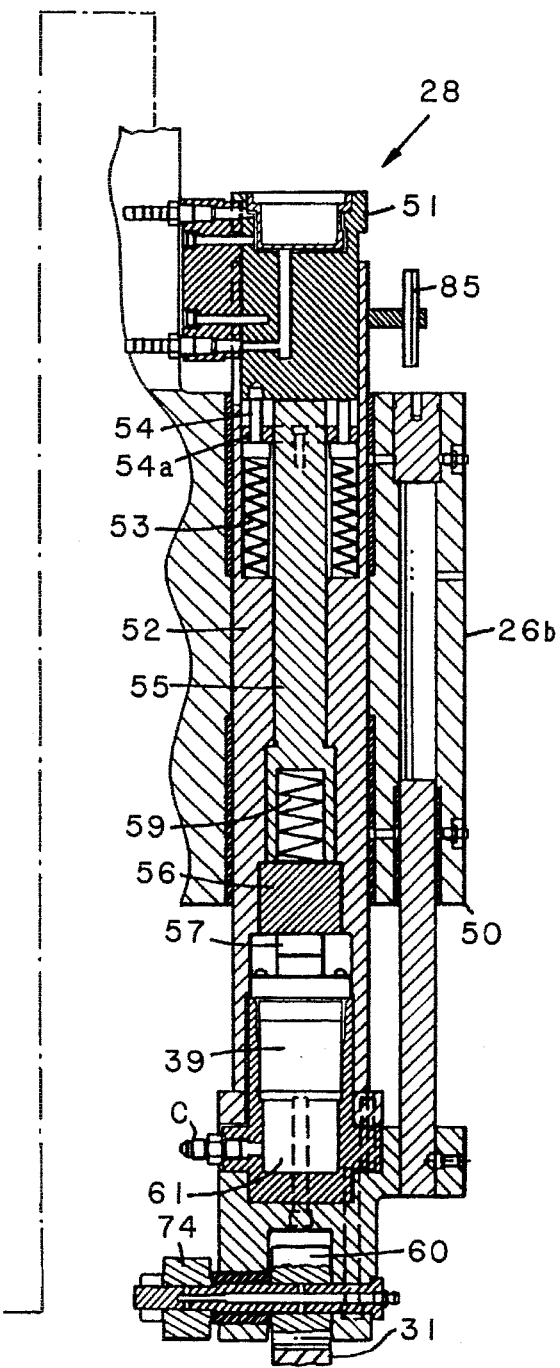

FIG. 6 is a vertical sectional view of one set of upper and lower tooling.

Figure 7:
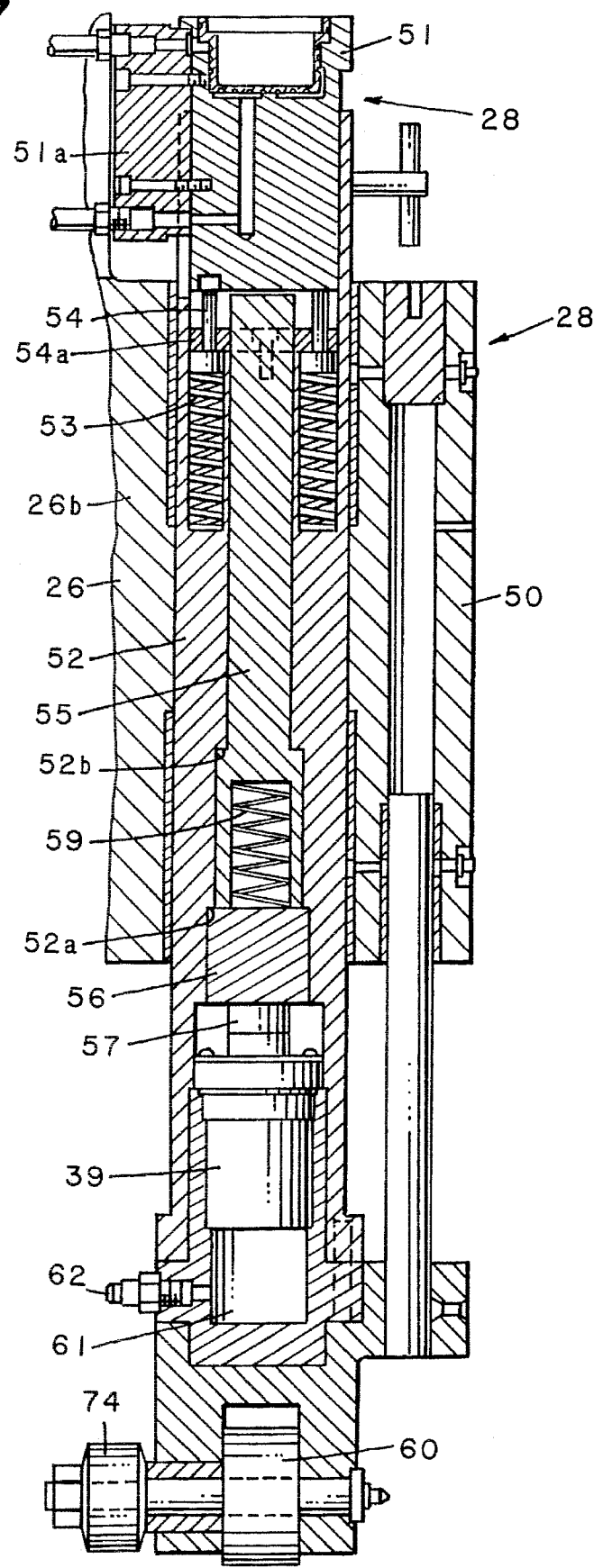

FIG. 7 is a fragmentary sectional view on an enlarged scale of the lower assembly of the set of tooling shown in FIG. 6.

FIGS. 8–11 are fragmentary sectional views of one set of tooling during various stages of compression molding.

Figure 12:
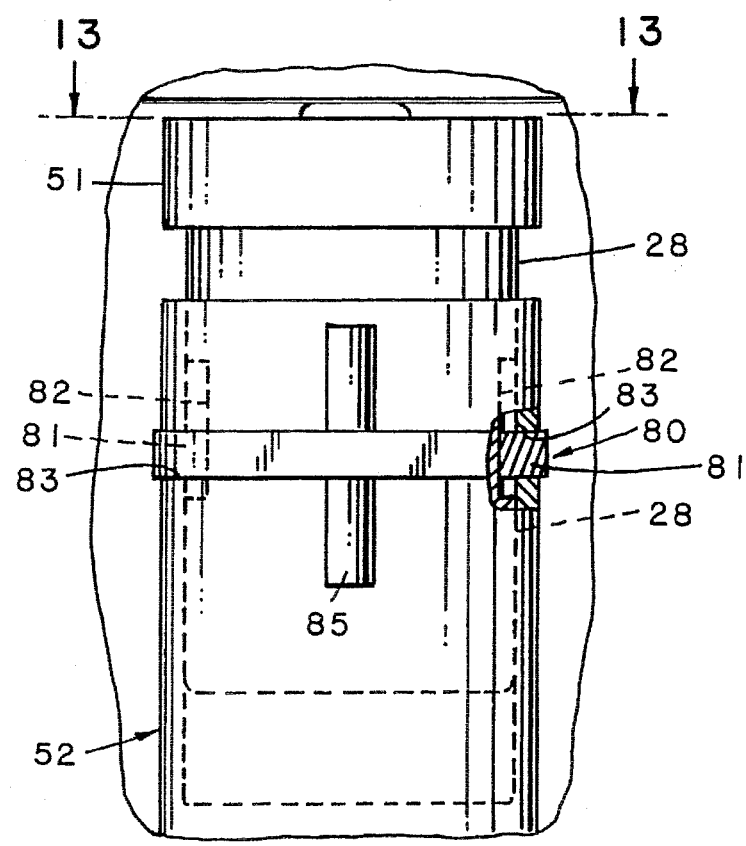

FIG. 12 is a fragmentary side elevational view of a portion of the tooling shown in FIG. 7.

Figure 13:
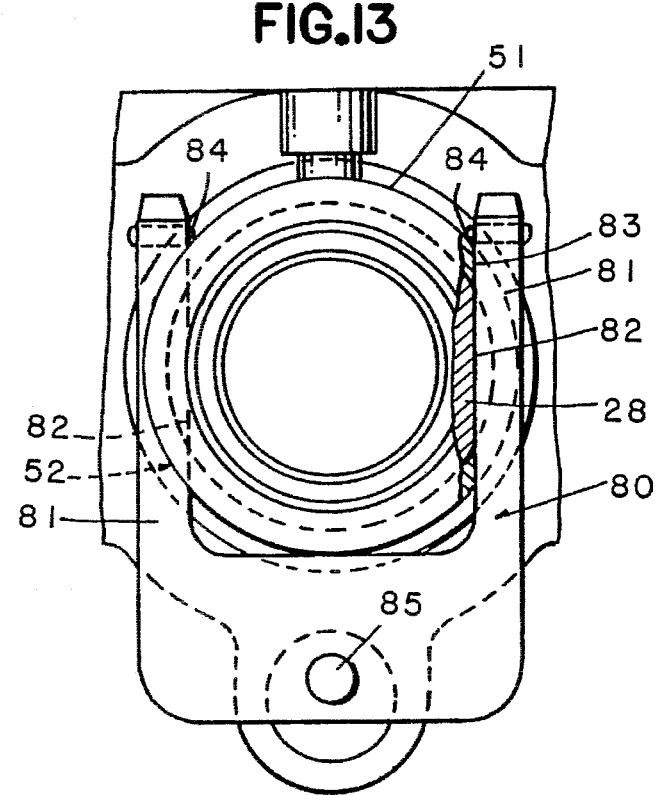

FIG. 13 is a fragmentary sectional view taken along the line 13—13 in FIG. 12.

Figure 14:
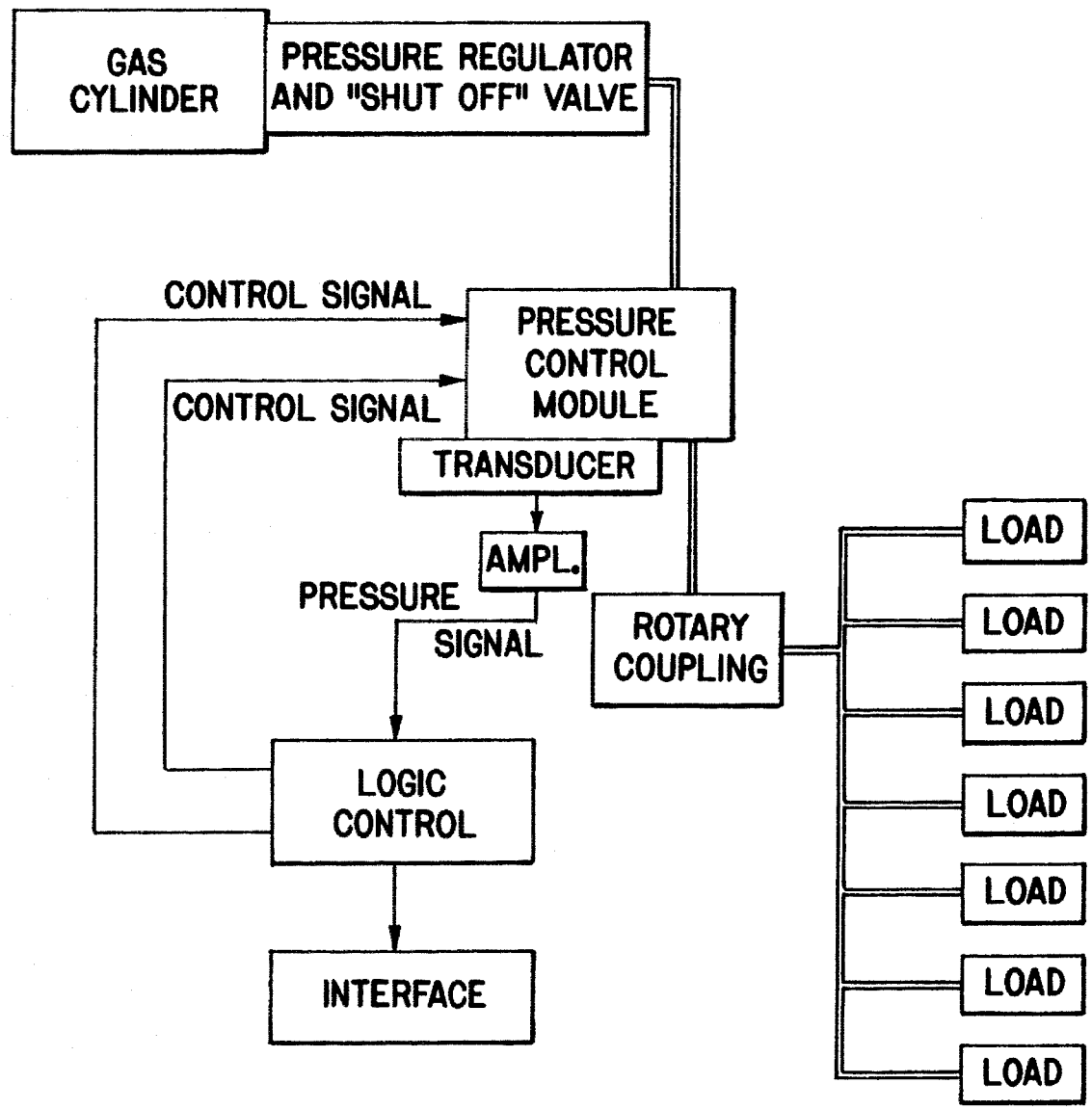

FIG. 14 is a schematic diagram of the nitrogen system utilized in the invention.

Figure 15:
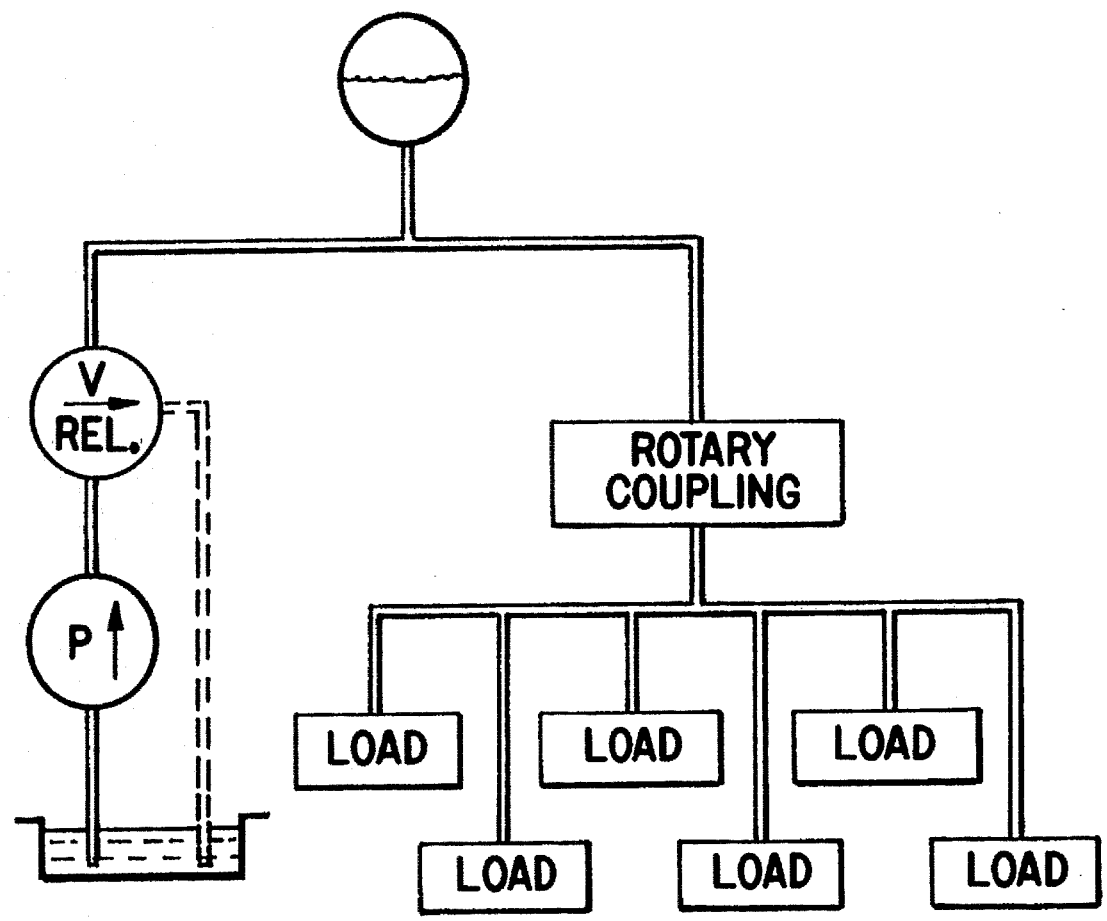

FIG. 15 is a schematic diagram of a modified system.

DESCRIPTION

Figure 1:
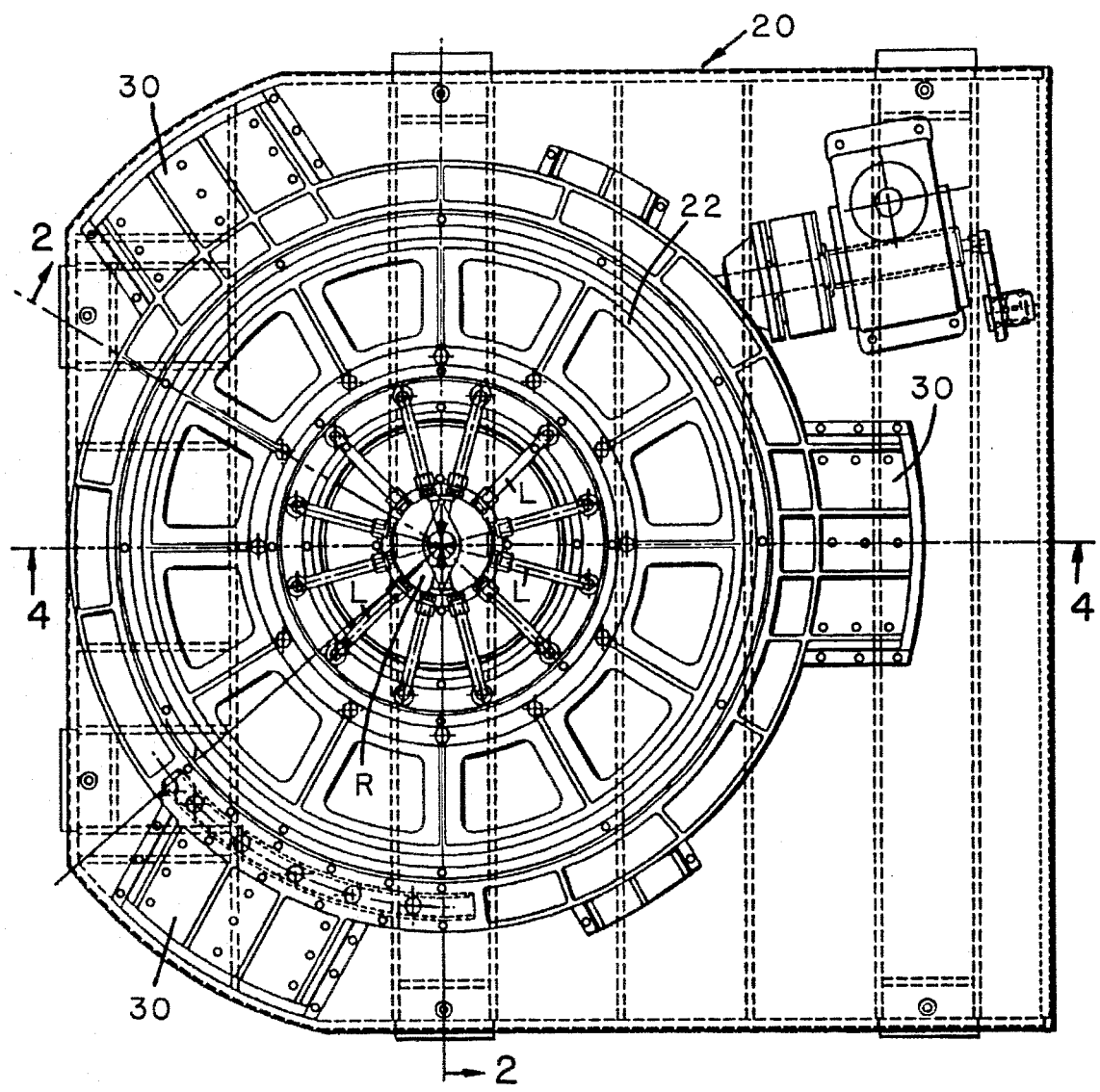
FIG. 1 is a plan view of an apparatus embodying the invention.
Figure 2:
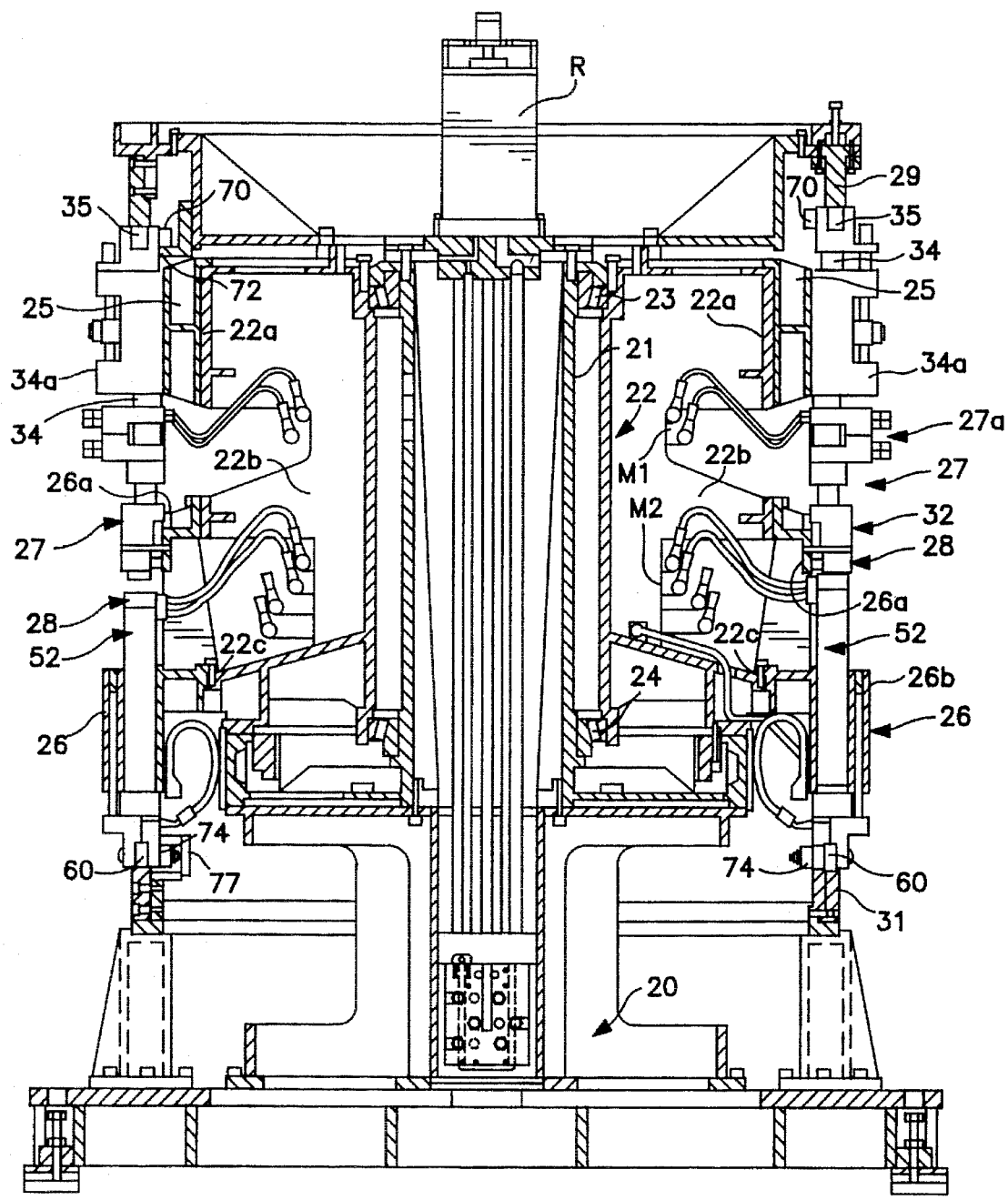
FIG. 2 is a sectional view taken along the line 2—2 in FIG. 1.
Figure 3:
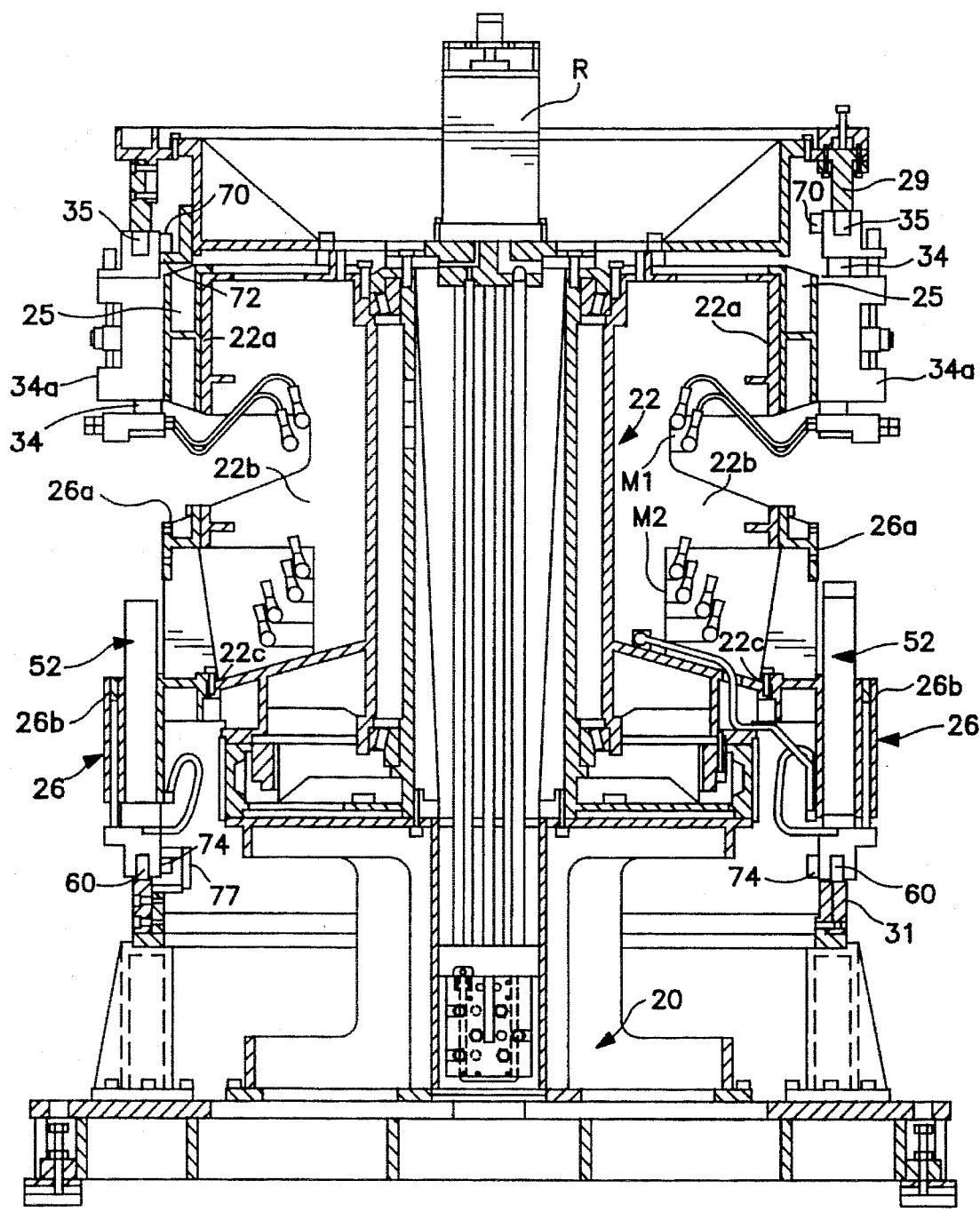
FIG. 3 is a sectional view similar to FIG. 2 with parts being removed.

Referring to FIGS. 1–3, the method and apparatus embodying the invention is shown as applied to a rotary apparatus that includes a base 20, supporting a column 21 on which a turret or carousel 22 is rotatably mounted by upper and lower tapered bearings 23, 24. Turret 22 includes vertically spaced supports comprising an annular upper support 22a, an annular support 22b, and a lower annular support 22c. A plurality of upper support segments 25 are mounted on upper support 22a and abut to define a ring. A plurality of lower segments 26 are mounted on the intermediate and lower supports 22b, 22c and abut to define a ring. Each segment 25 supports one or more of circumferentially spaced sets of actuators 34. Each segment 26 supports one or more actuators 52 adjacent the lower end of the apparatus. The actuators 34 are mounted for vertical movement in housings 34a mounted upon support segments 25 which, in turn, are supported on an upper ring mount 22a (FIGS. 2, 3).

Figure 4:
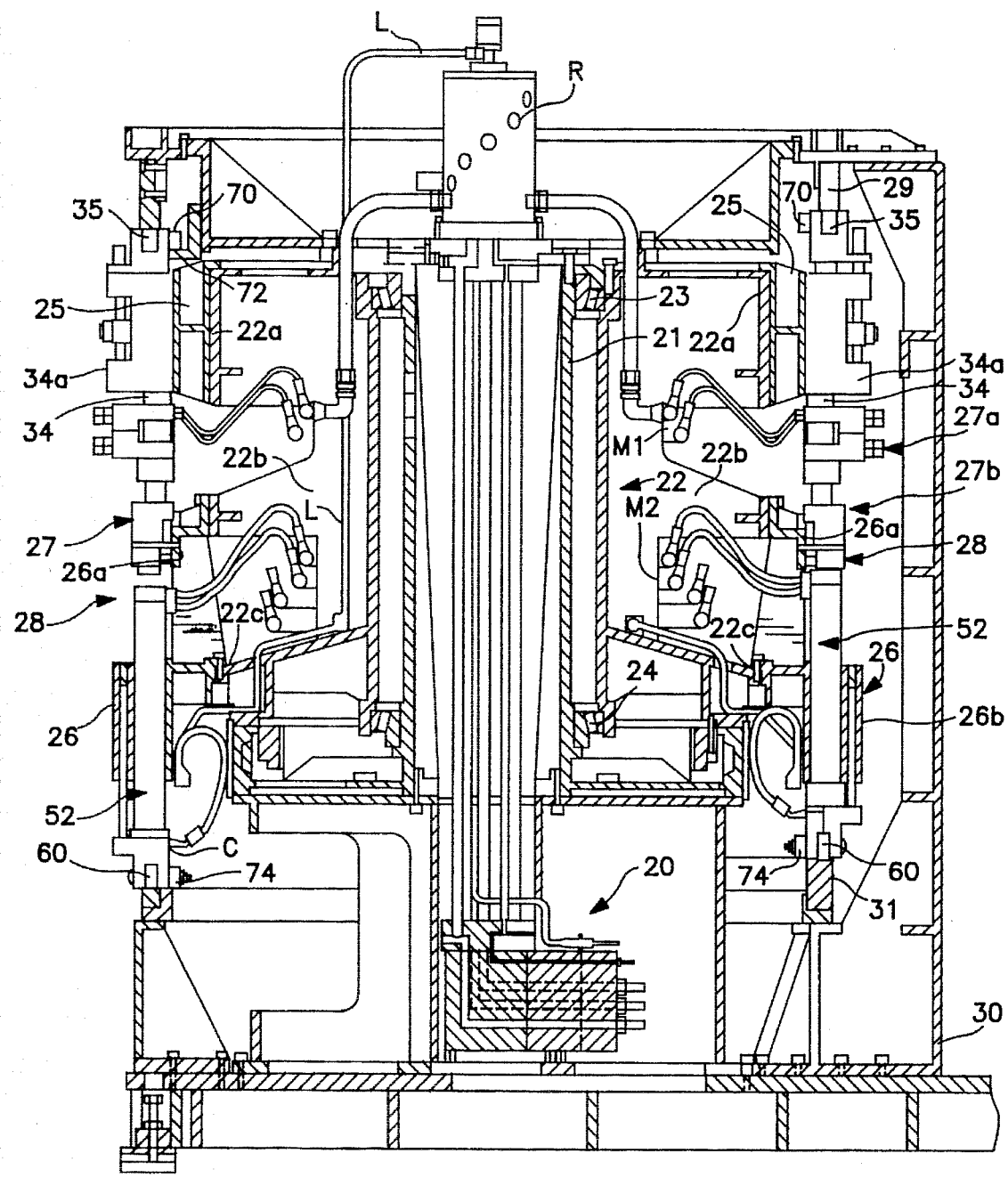
FIG. 4 is a fragmentary sectional view taken along the line 4—4 in FIG. 1.

An upper set of tooling 27 is associated with each actuator 34 and includes a movable assembly 27a mounted on the lower end of actuator 34 and a fixed assembly 27b mounted on a portion 26a of segment 26 that is fixed to support 22b (FIG. 6). A fixed annular cam 29 is supported by columns 30 (FIGS. 1, 4) and is associated with the upper actuators 34. Actuator 34, in turn, has a cam roller 35 at its upper end for engaging the cam 29.

A set of lower tooling 28 is mounted on each lower actuator 52. A fixed annular cam 31 is supported on base 20 and is associated with the lower actuators 52.

Each lower assembly 28 of tooling includes a female mold assembly 51 and a cooling water manifold 51a. Each actuator 52 has a roller 60 on its lower end for engaging cam 31 (FIG. 6).

Referring to FIG. 6, the fixed assembly 27b is mounted on a segment portion 26a of the segment 26. The movable assembly 27a comprises a mold plunger or core 41, a spring loaded core sleeve 42 urged upwardly by springs 45 and a stripper sleeve 44 urged downwardly by stripper springs 43. The core 41 is made in several sections and defines a male mold.

Referring to FIGS. 6 and 7, each actuator 52 is mounted in a support body 50 forming a part of segment portion 26b. The mold 51 has limited relative movement with respect to the actuator 52 and is yieldingly urged upwardly by cavity springs 53 which act upon lift pins 54. The lower actuator 52 further includes a plunger 55 that engages a holding spring plug 56 which in turn engages the piston 57 of a nitrogen cylinder 39. A centering spring 59 is interposed between the

4 holding spring plug 56 and the plunger 55. The nitrogen cylinder 39 is provided with nitrogen at an accurately determined pressure supplied to the area or chamber 61 below the nitrogen chamber 39 through a connector 62 having an orifice.

In this tooling style, the molding force is applied through the core sleeve 42 and the core 41 attached to the core sleeve 42 by a lost motion connection, the core 41 being biased upward by the array of springs 45. The upper cam 29 is fixed and the core sleeve 42 thus moves downward a fixed stroke as controlled by the upper cam 29.

Referring to FIGS. 12 and 13, provision is made for rapid removal of the cavity mold 51 and comprises a yoke 80 having spaced arms 81 that engage annular groove 83 in the actuator 52 and groove 82 in the cavity mold 51. Grooves 83 in actuator 52 are snugly engaged by arms 81. Groove 82 in cavity mold 51 has a greater axial width such that the cavity mold 51 has limited axial movement relative to the actuator 52. Spring loaded plungers 84 on the arms 81 extend inwardly to engage the periphery of mold 28. Yoke 80 includes a handle 85 to facilitate grasping the yoke 80.

The one piece cavity mold 51 is located on the lower tooling actuator 52, but is free to move axially a limited amount relative to actuator 52 by the construction shown in FIGS. 12 and 13 and the cavity mold 51 is held up by the array of springs 53 within the lower tooling actuator 52. These springs 53 are limited in stroke by the lift pins 54, which bottom out on a lift pin retainer 54a. The cavity mold 51 rests on the plunger 55, which is retained to limit its upward travel. The plunger 55 contacts the holding spring plug 56 and a spring 59 is fitted between the two components. The holding spring plug 56, in turn, contacts the piston rod 57 of nitrogen cylinder 39.

Referring to FIG. 7, nitrogen cylinder 39 is normally fully outstroked, maintaining the holding spring plug 56 against the locating stop surface 52a in the lower tooling actuator 52. The plunger 55, when free, will be moved up by the center spring 59 until it reaches a stop surface 52b within the lower tooling actuator 52.

Referring to FIG. 6, provision is made for lowering the upper actuator 34 and comprises the first roller 35 on the upper end thereof for engaging the upper cam 29 to cause the downward movement of the male mold assembly 32. In addition, a second roller 70 is provided for rotation about the same axis as roller 35 that engages a second fixed upper cam 72 (FIG. 2) for lifting the upper tooling 27 during the operating cycle in order.

Referring to FIG. 6, provision is made for lifting the lower actuator 52 and comprises a roller 60 on actuator 52 that engages the lower cam 31. In addition, a second roller 74 is provided for rotation about the same axis as roller 60 and engages a second fixed lower cam 77 for insuring that the cavity mold 51 is in its lowest position to receive a pellet of plastic.

OPERATION

Referring to FIGS. 6–11, the operation includes a series of steps:

Position #1 Open

FIGS. 6–7 show the tooling open condition with the upper tool assembly 27 up and the lower tool assembly 28 down.

Position #2 Closing of Mold

Figure 8:
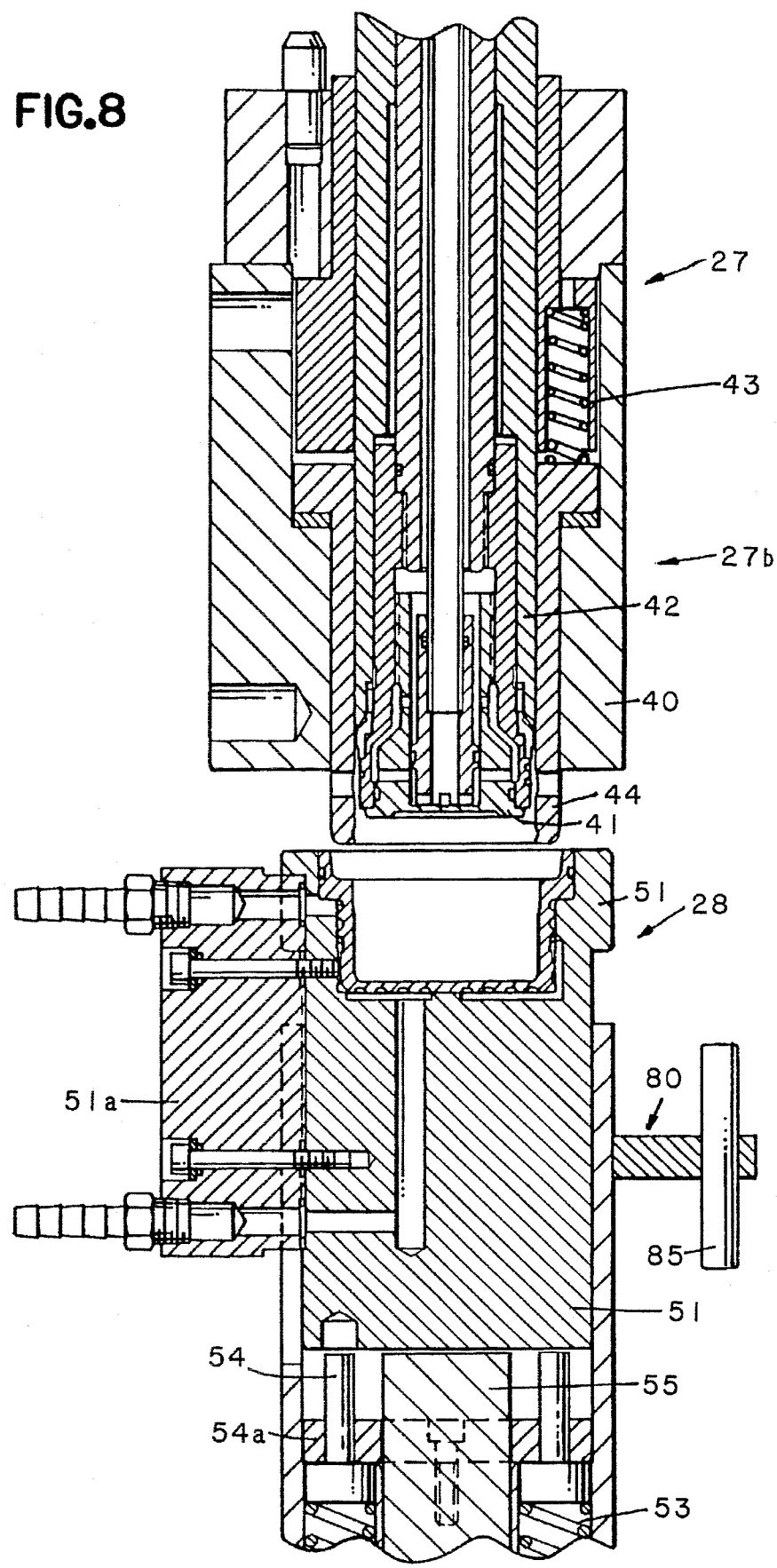
Figure 9:
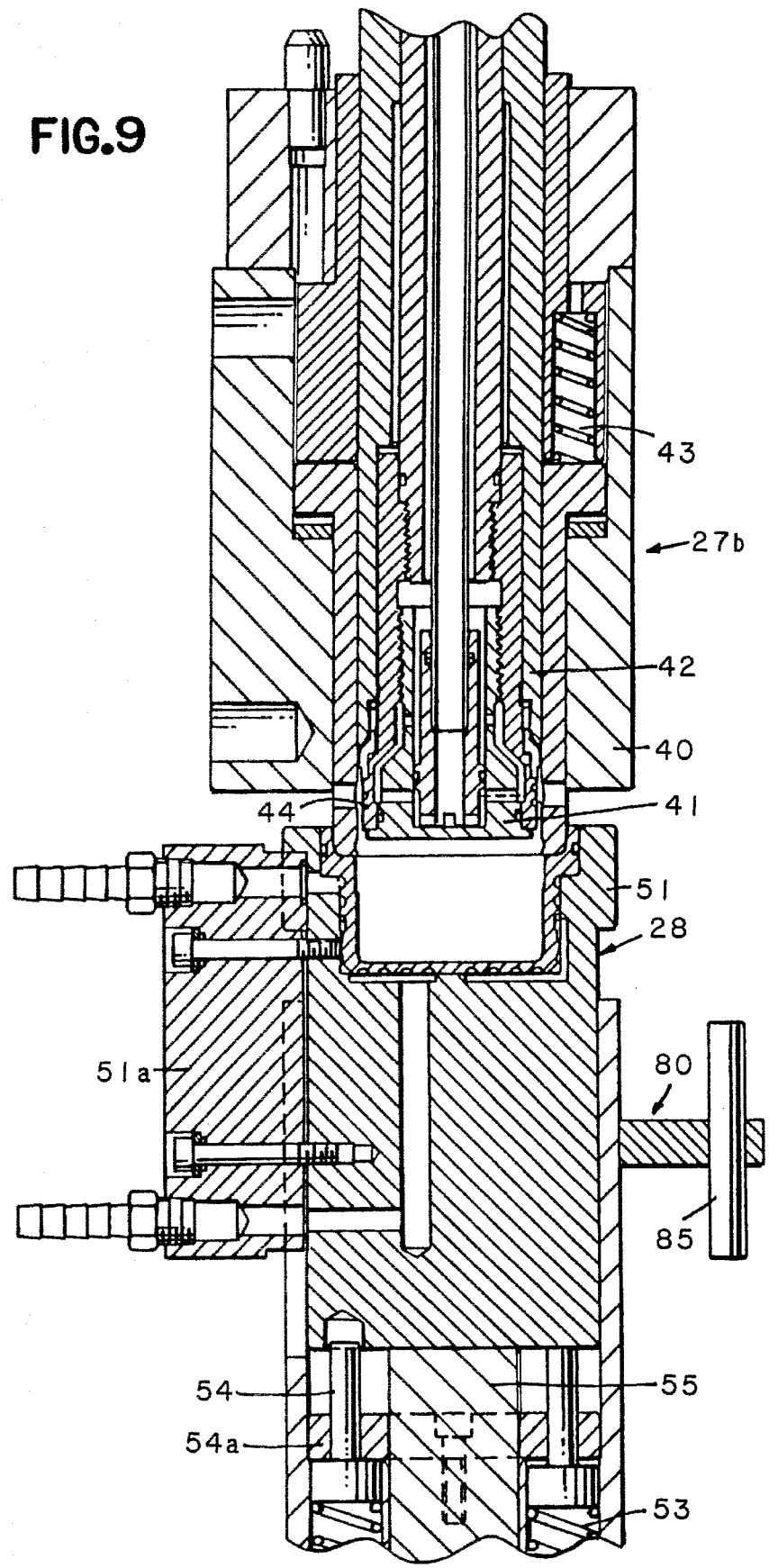

As shown in FIG. 8, after a charge or pellet of thermoplastic material is delivered to the female mold, the lower tooling actuator 52 is raised a fixed stroke by the lower cam 31, and the cavity 51 contacts the stripper sleeve 44 (FIG. 9). The stripper sleeve springs 43 initially overpower the weaker cavity springs 53, and subsequently the small spring 59 (FIG. 6) in the plunger 55 until the clearances are taken up and the nitrogen cylinder 39 opposes any further compression of the cavity. At this point the stripper sleeve 44 is forced upward against springs 43 for the remainder of the lower tooling upward stroke.

Position #3 Molding

Figure 10:
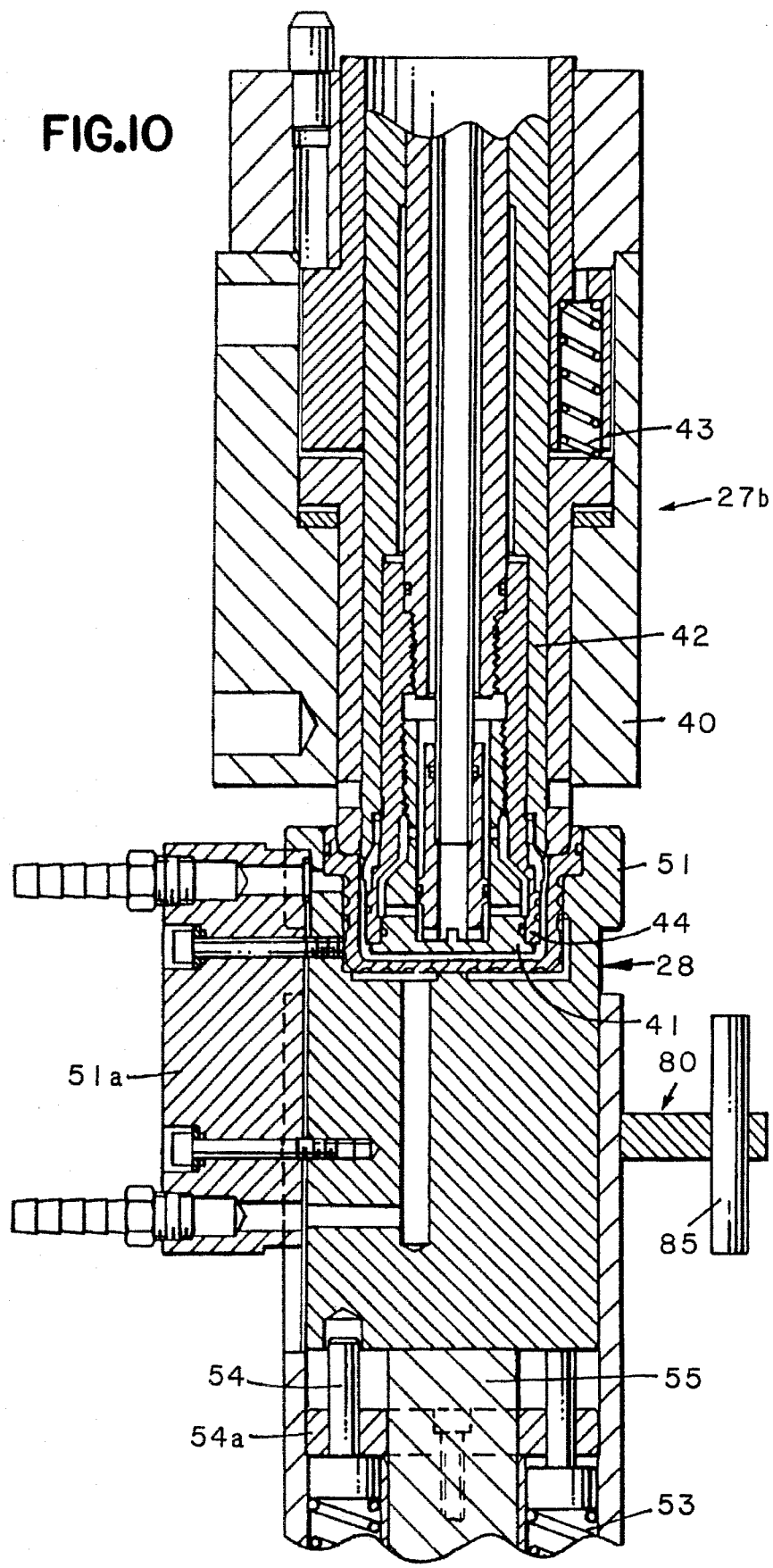

Referring to FIG. 10, the upper tooling is now lowered a fixed stroke to form the part, as controlled by the fixed upper forming cam 29. When the forming pressure increases to equal the force of the nitrogen cylinder 39, then the piston 57 of the nitrogen cylinder 39 moves to limit the molding force on the tooling. This forces the cavity 51 to lower, and causes the stripper sleeve springs 43 to move the stripper sleeve 44 downward in unison with the cavity 51, until the upper tool stroke is completed.

Position #3 Holding

Figure 11:
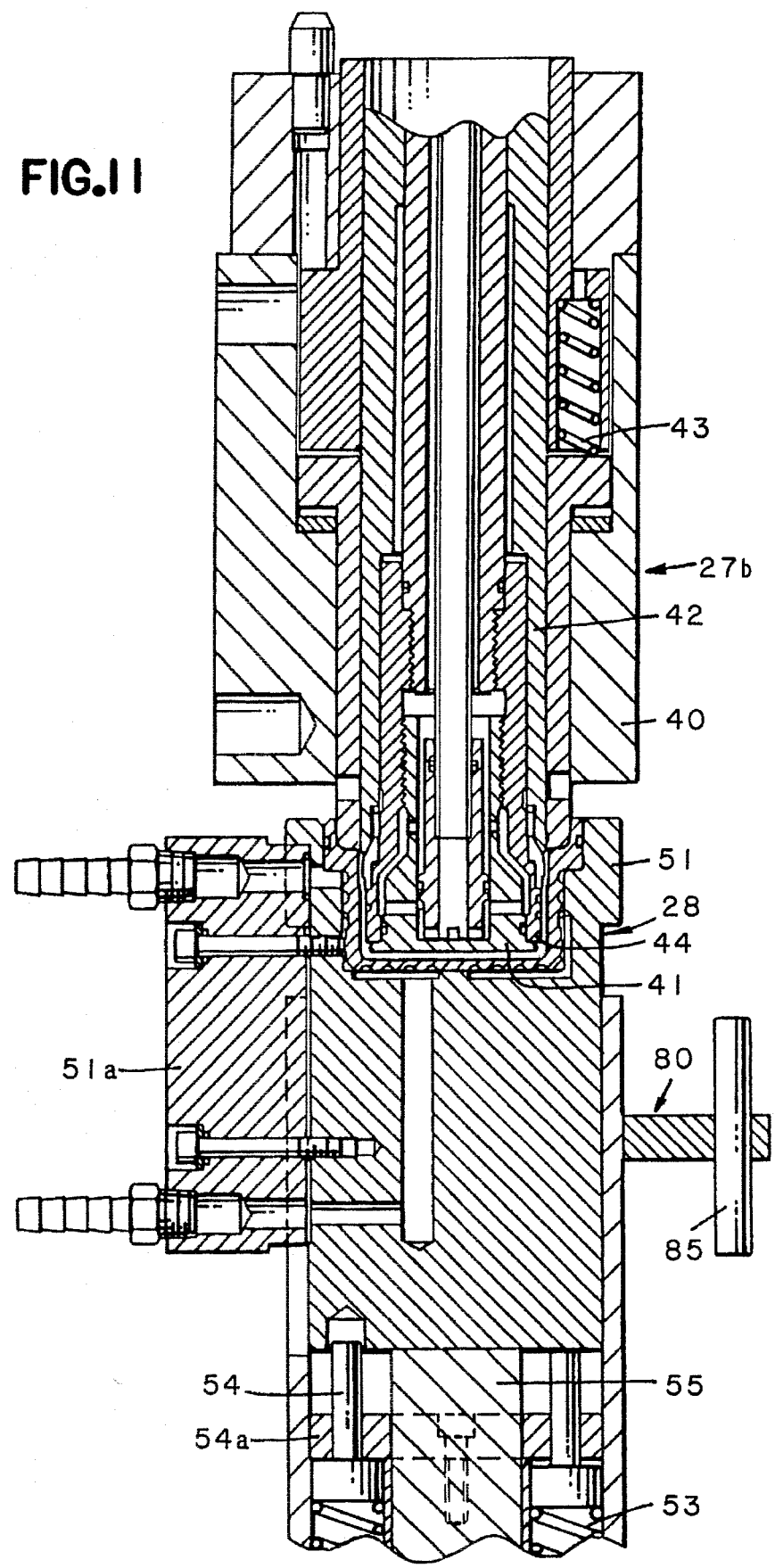

Referring to FIG. 11, a holding pressure is achieved through the parallel sections of the cams 29, 31, under control of the nitrogen cylinder 39. No relative axial movement of the tooling takes place during this phase.

Position #4 Lowered Holding Force Section

Referring to FIG. 11, a lesser holding force is achieved by a relief step in the upper cam 29 only, which allows the core sleeve 41 to become free from the cam 29. This causes the piston 57 of nitrogen cylinder 39 to outstroke until the holding spring plug 56 bottoms out. The cavity 51 is simultaneously lifted by the nitrogen cylinder 39, and the core sleeve 42 along with the core 41 are lifted by the cavity 51. The holding force is now maintained by the weight of the upper actuator 34 and the tooling pin assembly. The cavity springs 53 in the lower actuator 52 play no role in this part of the cycle and remain compressed by the higher rated stripper sleeve springs 43. The small spring 59 on the inner shaft 55 is also ineffective at this time.

Position #5 Cavity Stripping

During stripping of the closure from cavity 51, the lower tooling actuator 52 is lowered, leaving the closure on the molding core 41. If a threaded closure has been molded, then normally the stripper sleeve springs 43 would not overcome the closure strip force required, and would remain compressed, and the stripper sleeve 44 would not move down.

The core sleeve 42 is subsequently withdrawn by direct upward cam action due to engagement of roller 70 with second upper cam 71 (FIG. 2). The resistance of the closure to stripping from the threads causes the core 41 to stay down, until its lost motion with the core sleeve 42 is taken up. At this time, the core 41 is also pulled up by the action of the core sleeve 42, causing the core sleeve 42 to compress the array of core sleeve springs 45, and the part to be stripped from the core 41 as the stripper sleeve springs 43 overcome the stripping force.

Referring to FIG. 14, the control system for supplying nitrogen to each of the cylinders can be more readily understood by reference to this schematic. The designation LOAD represents cylinders which are connected to a rotary coupling R (FIG. 2) on the turret 22 that, in turn, is connected through a pressure control module and a pressure regulator and shut-off valve to a source of nitrogen such as a gas cylinder. Lines L such as hoses extend from the rotary coupling R (FIG. 1) to couplings C of the nitrogen cylinders 39 (FIG. 6). In the preferred form, the pressure control module includes a solenoid operated valve to exhaust gas to atmosphere, and a second solenoid valve to admit pressurized gas from the nitrogen gas cylinder. The interface is a computer and interactive screen to allow an operator to select a desired system pressure setting by direct input, or the setting could be established automatically by a menu selection from the computer. Preferably, the pressure signal reference to the logic control represents a high and a low pressure limit, and the logic control continually compares the feedback signal from a pressure transducer representing the actual system pressure at any one time. When a pressure is detected above the high limit setting, the logic control energizes the first solenoid valve to exhaust gas from the system until the system pressure is within limits. Conversely, a system pressure lower than the low limit causes the second solenoid valve to operate and to admit high pressure nitrogen from the gas cylinder until the system pressure is again within the preset limits.

Although the above description represents a preferred form of the pressure control module, other control systems may be used in which this control is achieved, and it it not intended to limit the scope of the invention.

FIG. 5 is a composite sectional view at various horizontal sections. In the lower left quadrant of FIG. 5, there is shown how a plurality of segments 25 are mounted on the turret and each supports the actuators 34 of five sets of upper tooling. In the lower left quadrant, there is shown how a plurality of segments 25 each supporting five sets of upper tooling 27 on the actuators. In the upper left quadrant there is shown how a plurality, shown as five, of the actuators 52 of lower sets of lower tooling 28 are provided on segments 33. Thus, if it is desired to vary the size or number of sets of tooling, the segments can support more or less sets depending on the size.

During normal operation, the molding force control is achieved with minimal compression of the gas cylinder, for example, on the order of 0.030 in. This control is maintained despite small variations in the volumetric capacity of the closed molds, and despite small variations in the weight of the delivered pellets. On the occasion of inadvertent loading of double pellets into a particular mold tool or due to incorrect setting of the mean pellet weight delivery for the particular mold, then the gas cylinder within the affected tooling will individually compress to absorb the additional stroke of the cavity and could compress to limit the molding force to an amount as preset by the gas system pressure up to an amount, for example, of approximately 0.500 in. If the pellet weight is outside the specified range for the part being molded, then the resulting part will be defective, but the machine loading will be limited by the molding force control described above, and thus machine damage will be eliminated.

Further, inasmuch as the cylinders within the tools are linked by a common system, and inasmuch as the system volume is much greater than the change in volume of the system during normal forming operation, (in excess of 1000:1) then the system pressure is substantially constant and each tooling is consequently controlled to the same preset molding force.

Thus, each set of tooling is controlled fully throughout the molding cycle since the same predetermined force is applied to a set of tooling at all times. In addition, each set of tooling is controlled without adversely affecting adjacent or other sets of tooling.

The advantages of the present invention can thus be summarized as follows:

a) Precise force control is provided on each set of tooling.

b) The predetermined force is applied to each set of tooling during the forming and holding portions of each cycle.

c) The force is substantially constant at all times.

d) The pressure control of one set of tooling does not adversely affect other sets of tooling.

e) The use of separate actuators which eliminates side load on the upper tooling.

f) The ability to readily change molding tooling.

g) The ability to readily change the number and size of tooling to form articles of various sizes and weights.

h) The use of continuous cams which require minimal maintenance.

Although in a preferred form gas cylinders are provided, in accordance with another aspect of the invention the cylinders may comprise hydraulic fluid cylinders supplied through a rotary coupling as shown schematically in FIG. 15. The hydraulic cylinders designated as LOAD are connected through the rotary coupling to a gas pressurized accumulator and the system is supplied with oil from a low volume pump with an adjustable pressure limiting valve. The gas charged accumulator provides for rapid changes in system volume as a result of piston displacement within the respective cylinders and avoids the need for a larger volume pump. If the gas charged accumulating is of sufficient capacity, then the resulting pressure control within the system would be substantially constant.

This system could function in a similar manner to the preferred form of the invention and the pressure could be remotely controlled by using a servo pilot operated pressure relieving valve. However, it has a disadvantage in situations where possible oil contamination is a concern.

Hydraulic systems without the gas charged accumulator would not be as effective as the preferred form of the invention as the hydraulic fluid is substantially incompressible and cannot be controlled or function as effectively as a gas system wherein the fluid is compressible.

It can thus be seen that there has been provided a method and apparatus for compression molding plastic articles including closures wherein the forming pressure can be accurately controlled; wherein the forming pressure can be readily adjusted; wherein lateral forces on the tooling are not applied directly to the forming tool; wherein the tooling may be readily replaced; wherein the number and size of tool stations can be readily changed; and wherein various kinds and sizes of articles including closures can be readily made by changing the tooling and associated actuating mechanisms; wherein the tooling will compensate for variations in pellet or charge weight, variations in mold tooling volume in the closed mold position and wherein a substantial overload such as a double charge of plastic can be readily absorbed without overloading the tooling or the overall apparatus.

We claim:

1. A method for compression molding a plastic article comprising providing a first tool assembly having a male mold associated therewith, providing a second tool assembly having a cavity mold associated therewith, providing a first fixed cam for moving the first tool assembly relative to said second assembly and a second fixed cam for moving said second tool assembly relative to first assembly, interposing a fluid cylinder comprising a fluid filled chamber and a piston on one of said tool assemblies interposed between one of said fixed cams and the associated tool assembly for urging said one tool assembly toward said other tool assembly to provide a constant limiting molding force during the full movement of the associated tooling under the actuation of said cams, providing said fluid in said fluid cylinder at a predetermined pressure to provide a constant limiting molding force during the forming of the plastic article of the associated tooling under the actuation of said cams, providing a charge of extrudate to the cavity of the cavity mold, moving the first and second assemblies under the action of said fixed cams to move the first assembly and second mold assembly toward one another to close the mold and provide a constant limiting molding force on the charge to compress the charge to form an article, providing an array of sets of said first tool assemblies, said associated second tool assemblies and said associated fluid cylinders having the pressure therein maintained at said predetermined pressure to provide a constant limiting molding force for each set of tooling assemblies unaffected by the other sets of tool assemblies during the full movement of the associated set under the actuation of said cams, moving said sets of tool assemblies successively in an endless path past a station wherein a charge of extrudate is delivered successively to a cavity mold, and thereafter moving said sets of tooling successively past the fixed cams such that the cams cause each set for first tool assembly and second tool assembly to close the mold and provide a constant molding force on the charge to compress the charge to form an article, and connecting the fluid cylinder to a common source of fluid under said predetermined pressure.

2. The method set forth in claim 1 including interposing said fluid cylinder between said second tool assembly and said second fixed cam.

3. The method set forth in claim 2 wherein said step of interposing said fluid cylinder comprises providing a gas cylinder.

4. The method set forth in claim 2 wherein said step of interposing said fluid cylinder comprises providing a nitrogen cylinder.

5. The method set forth in claim 2 wherein said step of interposing said fluid cylinder comprises providing a hydraulic cylinder, said step of providing said fluid at a predetermined pressure in said fluid cylinder comprises providing accumulator means connected with said hydraulic cylinder.

6. The method set forth in claim 3 including sensing the pressure in said gas cylinders and producing a signal and controlling said pressure in response to variation of the pressure signal from a predetermined pressure.

7. The method set forth in claim 6 including providing a rotary coupling between said source and said gas cylinders.

8. The method set forth in claim 7 whereby said step for sensing said pressure is performed by sensing the pressure between said source and said rotary coupling.

9. The method set forth in claim 1 wherein the step of providing said first tool assembly comprises providing a plunger and the step of providing said second tool assembly comprises providing a cavity for forming a closure having a base wall and a peripheral skirt.

10. The method set forth in claim 1 including providing a second fixed upper cam for lifting the first tool assembly.

11. The method set forth in claim 10 including providing a second fixed lower cam for lowering said second tool assembly.

12. The method set forth in claim 11 including providing an upper actuator interposed between said second fixed upper cam and said first tool assembly and movable by said second fixed upper cam toward said second tool assembly.

13. The method set forth in claim 12 wherein said step of providing said first tool assembly includes providing a movable assembly mounted on said upper actuator and a fixed assembly.

14. The method set forth in claim 13 including providing a lower actuator interposed between said second fixed lower cam and said second tool assembly and movable by said second fixed lower cam toward said first tool assembly.

15. The method set forth in claim 14 including mounting said cavity mold for limited axial movement with respect to the lower actuator.

16. The method set forth in claim 15 including yieldingly urging said cavity mold upwardly.

17. The method set forth in claim 16 including providing said lower actuator with a plunger yieldingly urged toward said cavity mold.

18. The method set forth in claim 17 including providing a plug interposed between said piston of said fluid cylinder and said plunger.

19. The method set forth in claim 18 including providing centering spring means interposed between said plug and said plunger.

20. The method set forth in claim 19 including providing a yoke engaging said cavity mold, said yoke having spaced arms, providing said cavity mold with a groove, providing said actuator with an annular groove having a greater axial width than said arms, causing said arms to engage said groove on said lower actuator and said groove on said cavity mold such that the cavity mold has limited axial movement relative to said actuator.

21. The method set forth in claim 20 including providing said arms with means thereon yieldingly engaging the periphery of said cavity mold.

22. The method set forth in claim 21 including providing handle means on said yoke.

23. The method set forth in claim 14 including providing means removably mounting said cavity mold on said lower actuator.

24. The method set forth in claim 3 including providing a control system for supplying gas to said gas cylinders including providing a source of gas under pressure, providing control means for sensing the pressure in each said cylinder, comparing the pressure with a predetermined maximum pressure value and a predetermined minimum pressure value and controlling the pressure when the pressure exceeds the predetermined maximum pressure or is below said predetermined minimum pressure.

25. The method set forth in claim 24 including providing said control means with a pressure control module for sensing said pressures and logic control means providing electrical signals to said control module corresponding to said maximum and minimum pressures.

26. The method set forth in claim 24 including providing a rotary coupling connecting to said control means and each said gas cylinder.

27. The method set forth in claim 5 including providing a rotary coupling interposed between said accumulator means and each of said hydraulic cylinders.

28. An apparatus for compression molding a plastic article comprising a first mold assembly having a male mold associated therewith, a second mold assembly having a cavity mold associated therewith, a first fixed cam for moving said first mold assembly relative to said second mold assembly, a second fixed cam for moving said second mold assembly relative to said first mold assembly, a fluid cylinder having a fluid filled chamber at a predetermined pressure and a piston on one of said tool assemblies interposed between one of said first fixed cam and said first mold assembly and said second fixed cam and said second mold assembly and urging said one tool assembly toward said other tool assembly interposed between to provide a constant limiting molding force during the full movement of the associated tooling under the actuation of said cams, an array of sets of first tool assemblies, associated second tool assemblies, and associated fluid cylinders having the pressure therein maintained at said predetermined pressure to provide a constant limiting molding force for each set of tooling assemblies unaffected by the other sets of tooling assemblies, means for moving said sets of tooling assemblies successively in an endless path past a station wherein a charge of extrudate is delivered successively to a cavity mold, and thereafter successively past said fixed cams to cause each set of first tool assembly to close the mold and provide a constant limiting molding force on the charge to compress the charge to form into an article, and means connecting the fluid chambers of said fluid cylinders to a source of fluid pressure.

29. The apparatus set forth in claim 28 wherein said fluid cylinder is interposed between the second tool assembly and said second fixed cam.

30. The apparatus set forth in claim 29 wherein said fluid cylinder comprises a gas cylinder.

31. The apparatus set forth in claim 29 wherein said fluid cylinder comprises a nitrogen cylinder.

32. The apparatus set forth in claim 29 wherein said fluid cylinder comprises a hydraulic cylinder.

33. The apparatus set forth in claim 29 wherein said first tool assembly comprises a plunger and said second tool assembly comprises a cavity for forming a closure having a base wall and peripheral skirt.

34. The apparatus set forth in claim 30 including means sensing the pressure in said gas cylinders and producing a signal and means for controlling the pressure in response to variation of the pressure signal from a predetermined pressure.

35. The apparatus set forth in claim 34 including a rotary coupling between said source and said gas cylinders.

36. The apparatus set forth in claim 35 wherein said means for sensing pressure is positioned to sense the pressure between a source and said rotary coupling.

37. The apparatus set forth in claim 30 including a second fixed upper cam for lifting the first tool assembly.

38. The apparatus set forth in claim 37 including a second fixed lower cam for lowering said second tool assembly.

39. The apparatus set forth in claim 38 including an upper actuator interposed between said second fixed upper cam and said first tool assembly and movable by said second fixed upper cam toward said second tool assembly.

40. The apparatus set forth in claim 39 wherein said first tool assembly comprises a movable assembly mounted on said upper actuator and a fixed assembly.

41. The apparatus set forth in claim 40 including a lower actuator interposed between said second fixed lower cam and said second tool assembly and movable by said second fixed lower cam toward said first tool assembly.

42. The apparatus set forth in claim 41 including means for mounting said cavity mold for limited axial movement with respect to the lower actuator.

43. The apparatus set forth in claim 42 including means yieldingly urging said cavity mold upwardly.

44. The apparatus set forth in claim 43 wherein said lower actuator includes a plunger yieldingly urged toward said cavity mold.

45. The apparatus set forth in claim 43 including a plug interposed between said piston of said fluid cylinder and said plunger.

46. The apparatus set forth in claim 43 including centering spring means interposed between said plug and said plunger.

47. The apparatus set forth in claim 41 including a yoke engaging said cavity mold, said yoke having spaced arms, said cavity mold having a groove, said actuator having an annular groove having a greater axial width than said arms, said arms engaging said groove on said lower actuator and said groove on said cavity mold such that the cavity mold has limited axial movement relative to said actuator.

48. The apparatus set forth in claim 47 wherein said arms have means thereon yieldingly engaging the periphery of said cavity mold.

49. The apparatus set forth in claim 48 including handle means on said yoke.

50. The apparatus set forth in claim 30 including means removably mounting said cavity mold on said lower actuator.

51. The apparatus set forth in claim 28 wherein said cylinders are gas cylinders, a control system for supplying gas to said gas cylinders comprising including a source of gas under pressure, control means for sensing the pressure in each said cylinder, comparing the pressure with a predetermined maximum pressure value and a predetermined minimum pressure value and controlling the pressure when the pressure exceeds the predetermined maximum pressure or is below said predetermined minimum pressure.

52. The apparatus set forth in claim 51 wherein said control means includes a pressure control module for sensing said pressures and logic control means providing electrical signals to said control module corresponding to said maximum and minimum pressures.

53. The apparatus set forth in claim 51 wherein said control system includes a rotary coupling connected to said control means and each said gas cylinder.

54. The apparatus set forth in claim 28 wherein said cylinders are hydraulic cylinders including accumulator means connected to a source of hydraulic fluid and said hydraulic cylinders.

55. The apparatus set forth in claim 54 including a rotary coupling interposed between said accumulator means and each of said hydraulic cylinders.

* * * * *